(12) United States Patent
Chaudet et al.

(10) Patent No.: US 10,597,075 B2
(45) Date of Patent: Mar. 24, 2020

(54) TWISTED BAR FOR ATTACHING A STEERING CYLINDER OF A VEHICLE TO A WHEEL AXLE, VEHICLE COMPRISING SUCH A BAR AND PROCESS FOR MANUFACTURING SUCH A BAR

(71) Applicant: VOLVO TRUCK CORPORATION, Göteborg (SE)

(72) Inventors: Jerome Chaudet, Sainte Julie (FR); Jean-Marc Blond, Saint Pierre de Chandieu (FR); Jean-Baptiste Doray, Chasse sur Rhone (FR)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 15/545,115

(22) PCT Filed: Feb. 18, 2015

(86) PCT No.: PCT/IB2015/000897
§ 371 (c)(1),
(2) Date: Jul. 20, 2017

(87) PCT Pub. No.: WO2016/132169
PCT Pub. Date: Aug. 25, 2016

(65) Prior Publication Data
US 2018/0015949 A1    Jan. 18, 2018

(51) Int. Cl.
*B62D 7/10* (2006.01)
*B62D 7/16* (2006.01)
(Continued)

(52) U.S. Cl.
CPC ............... *B62D 7/10* (2013.01); *B62D 5/12* (2013.01); *B62D 7/06* (2013.01); *B62D 7/16* (2013.01); *B60Y 2410/12* (2013.01)

(58) Field of Classification Search
CPC ......... B62D 7/10; B62D 7/16; B60Y 2410/12
See application file for complete search history.

(56) References Cited

U.S. PATENT DOCUMENTS

| | | | | |
|---|---|---|---|---|
| 1,375,138 A | * | 4/1921 | Duerst | B60Q 1/124 |
| | | | | 362/56 |
| 2,218,064 A | * | 10/1940 | Amsbury | B62D 49/0671 |
| | | | | 172/291 |
| 2014/0008885 A1 | | 1/2014 | Kim | |

FOREIGN PATENT DOCUMENTS

CN    201419727 Y    3/2010
CN    201619601 U    11/2010
(Continued)

OTHER PUBLICATIONS

International Search Report (dated Nov. 9, 2015) for corresponding International App.PCT/IB2015/000897.
(Continued)

*Primary Examiner* — Faye M Fleming
(74) *Attorney, Agent, or Firm* — Withrow & Terranova, PLLC

(57) ABSTRACT

A bar is designed for attaching a steering cylinder of a vehicle to a wheel axle. The bar is twisted around its longitudinal axis. The bar is manufactured by cutting out a rectangular plate of metallic material or of composite material, clamping the longitudinal ends of the cut-out plate, and pivoting one end or pivoting both ends in opposite directions, around a longitudinal axis of the plate.

13 Claims, 4 Drawing Sheets

(51) Int. Cl.
*B62D 5/12* (2006.01)
*B62D 7/06* (2006.01)

(56) References Cited

FOREIGN PATENT DOCUMENTS

| | | |
|---|---|---|
| CN | 202225910 U | 5/2012 |
| CN | 103889204 A | 6/2014 |
| GB | 228044 A | 1/1925 |
| JP | 56050867 A * | 5/1981 ............... B62D 7/10 |

OTHER PUBLICATIONS

Chinese Official Action (dated Oct. 26, 2018) for corresponding Chinese App. 201480076461.X.
Second Office Action for Chinese Patent Application No. 201580076461.X, dated May 27, 2019, 12 pages.
Third Office Action for Chinese Patent Application No. 201580076461.X, dated Sep. 29, 2019, 13 pages.
International Preliminary Report on Patentability for International Patent Application No. PCT/IB2015/000897, dated Aug. 31, 2017, 8 pages.

* cited by examiner

US 10,597,075 B2

TWISTED BAR FOR ATTACHING A STEERING CYLINDER OF A VEHICLE TO A WHEEL AXLE, VEHICLE COMPRISING SUCH A BAR AND PROCESS FOR MANUFACTURING SUCH A BAR

BACKGROUND AND SUMMARY

The invention relates to a bar for attaching a steering cylinder of a vehicle to a wheel axle, to a vehicle comprising such a bar and to a process for manufacturing the bar.

The invention can be applied in heavy-duty vehicles, such as trucks, buses and construction equipments. Although the invention will be described with respect to a truck, the invention is not restricted to this particular vehicle, but may also be used in other vehicles, such as cars.

In a known manner, a vehicle includes a front axle and a rear axle supporting each two opposite wheels and a steering arrangement for turning the front wheels using a hand-operated steering wheel. In practice, this steering arrangement includes a steering cylinder arranged in front of the wheel axle and receiving a highly pressurized fluid when the driver manipulates the steering wheel. The pressurized fluid generates then a steering force for turning the wheels. The steering cylinder comprises a cylinder body and left and right cylinder rods provided to be extended from and retracted into the cylinder body. The ends of left and right cylinder rods that are opposite to the steering cylinder are respectively hinged to swing links, so as to form a four-bar link structure that is swung by extension and retraction of the steering cylinder rods.

The vehicle further comprises a means for attaching the steering cylinder to the axle beam. This means may be a linking bar. The kinematics of the steering arrangement is such that the steering cylinder may rotate in a horizontal and in a vertical plane. Furthermore, the wheel axle may be distorted over time, which induces a deformation of the steering cylinder and of the linking bar as they are less flexible than the axle. This may involve a steering failure. Consequently, means for attaching the steering cylinder to the axle beam are oversized to absorb both the axle deformation and the motion of the steering cylinder relative to the wheel axle.

US-A-2014/0008885 discloses an agricultural tractor where the steering cylinder is attached to the front wheel axle by means of two connecting rods, respectively attached at the top and at the bottom of the steering cylinder. The connecting rods are articulated at both extremities so that, when the steering cylinder is operated, it may move forwards and rearwards within a predetermined range, while being prevented from moving to the left or to the right of the vehicle. Moreover, two other connecting rods are hinged to the cylinder rods so as to make the coupling of the steering cylinder to the wheel axle more reliable. As a result, the steering cylinder attachment requires a lot of ball joints, which are wearing parts expensive to replace.

It is desirable to provide a bar for attaching a steering cylinder of a vehicle to a wheel axle that can absorb both the axle deformation, without transmitting the axle load to the steering cylinder and the motion of the steering cylinder relative to the wheel axle. In this way, no other connecting rod is required to prevent unwanted rotational movements and less wearing parts are used to attach the steering cylinder to the wheel axle.

To this end, the invention concerns, according to an aspect thereof, a bar for attaching a steering cylinder of a vehicle to a wheel axle. According to an aspect of the invention, the bar is twisted around its longitudinal direction.

Thanks to an aspect of the invention, given that a twisted bar can be easily compressed or extended in its longitudinal direction, it behaves like an elastic spring, thereby absorbing the axle beam deformation and the relative movement of the cylinder with respect to the wheel axle. Consequently, the efforts generated on the axle beam are not transmitted to the steering cylinder, which means that the steering arrangement is not affected either by the axle beam distortion or by the steering cylinder motion. Furthermore, no ball joints are used to attach the steering cylinder to the wheel axle.

According to further aspects of the invention, which are advantageous but not compulsory, such a bar may include one or several of the following features:
- The bar includes two end plates for securing the bar to the steering cylinder and to the axle.
- Each end plate delimits at least one hole for a fixing screw or a rivet.
- The end plates are parallel.
- The bar includes a middle plate that is perpendicular to the end plates
- The bar is in metal or in composite material.
- The bar is bolted or riveted to the steering cylinder and/or to the wheel axle.
- The bar is clamped to the steering cylinder and/or to the wheel axle by means of a flange.

The invention also concerns, according to an aspect thereof, a vehicle, comprising an axle, a steering cylinder and a bar, as previously defined, for attaching the steering cylinder to the axle.

According to further aspects of the invention, which are advantageous but not compulsory, such a vehicle may include one or several of the following features:
- In assembled state of the bar in the vehicle, the bar is inclined with an angle inferior to 10° relative to a longitudinal axis of the wheel axle.
- The steering cylinder is arranged in front of or behind the wheel axle.

The invention finally relates to a process for manufacturing a bar for attaching a steering cylinder of a vehicle to a wheel axle, comprising steps consisting in or comprising:
a) cutting out a rectangular plate of metallic material or of composite material, and
b) pivoting one end or pivoting both ends in opposite directions, around a longitudinal axis of the plate.

According to further aspects of the invention, which are advantageous but not compulsory, such a process may include one or several of the following features:
- At step b), both ends are pivoted by the same twisting angle.
- At step b), both ends are pivoted by a twisting angle of 90° around the longitudinal axis (X22).
- The process includes a step posterior to step a) and anterior to step b) consisting in or comprising: clamping a middle portion of the bar.

BRIEF DESCRIPTION OF THE DRAWINGS

The invention will now be explained in correspondence with the annexed figures, and as an illustrative example, without restricting the invention. In the annexed figures.

DETAILED DESCRIPTION

Figure 1:
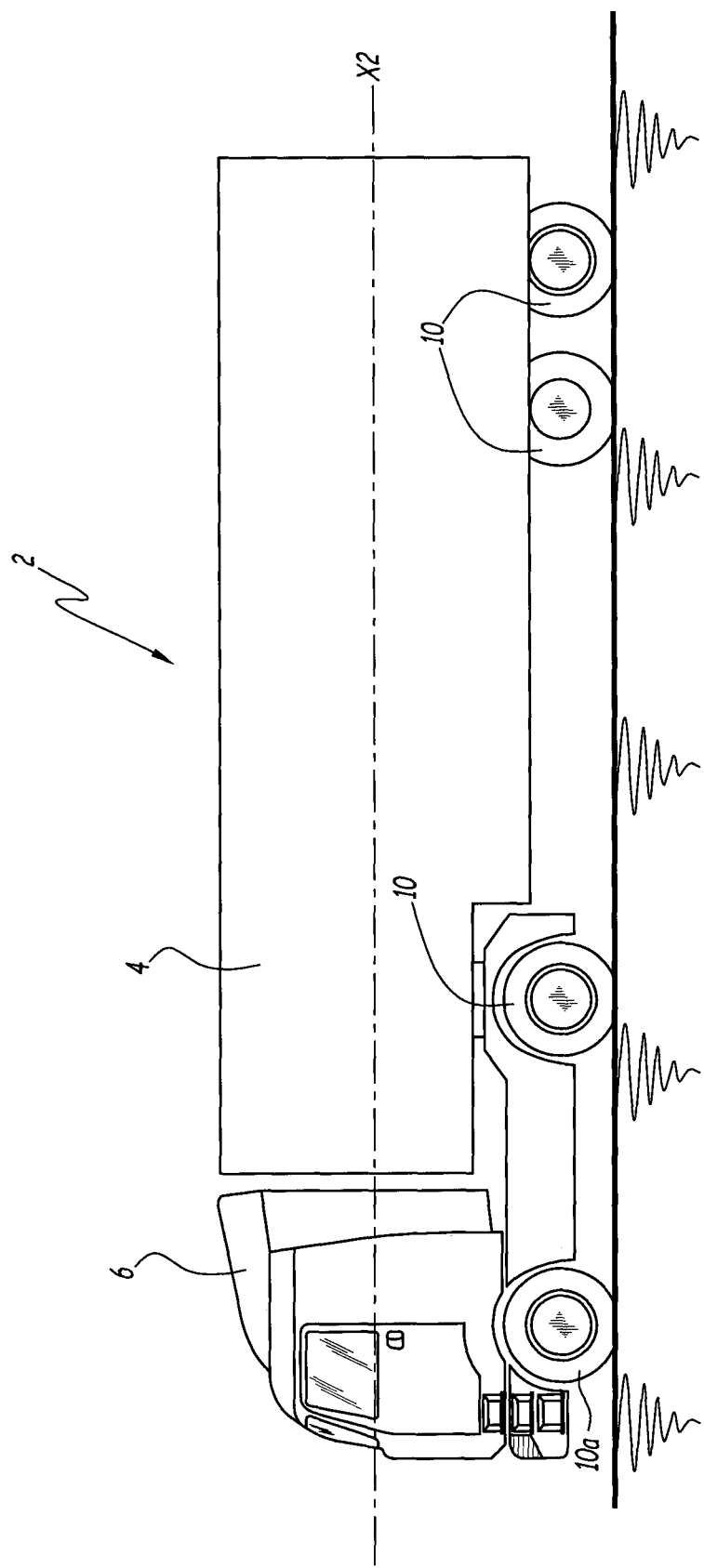
FIG. 1 is a side view of a truck comprising a front and a rear axle, a steering cylinder and a non-represented bar according to the invention, for attaching the steering cylinder to the vehicle front axle.

FIG. 1 represents a truck 2. Truck 2 extends along a longitudinal axis X2 that represents a driving direction of the truck 2. Truck 2 includes a traction unit, or lorry 6, for towing a trailer 4. Lorry 6 includes two pairs of wheels 10 and 10a, with 10a denoting the pair of front wheels. Trailer 4 also includes two pairs of rear wheels 10. The front wheels 10a are arranged to pivot around a non-represented wheel axle. Truck 2 further comprises a steering arrangement 13 for turning the front wheels 10a of the truck 2 under command of a non-represented hand-operated steering wheel arranged in the driver cabin.

Figure 2:
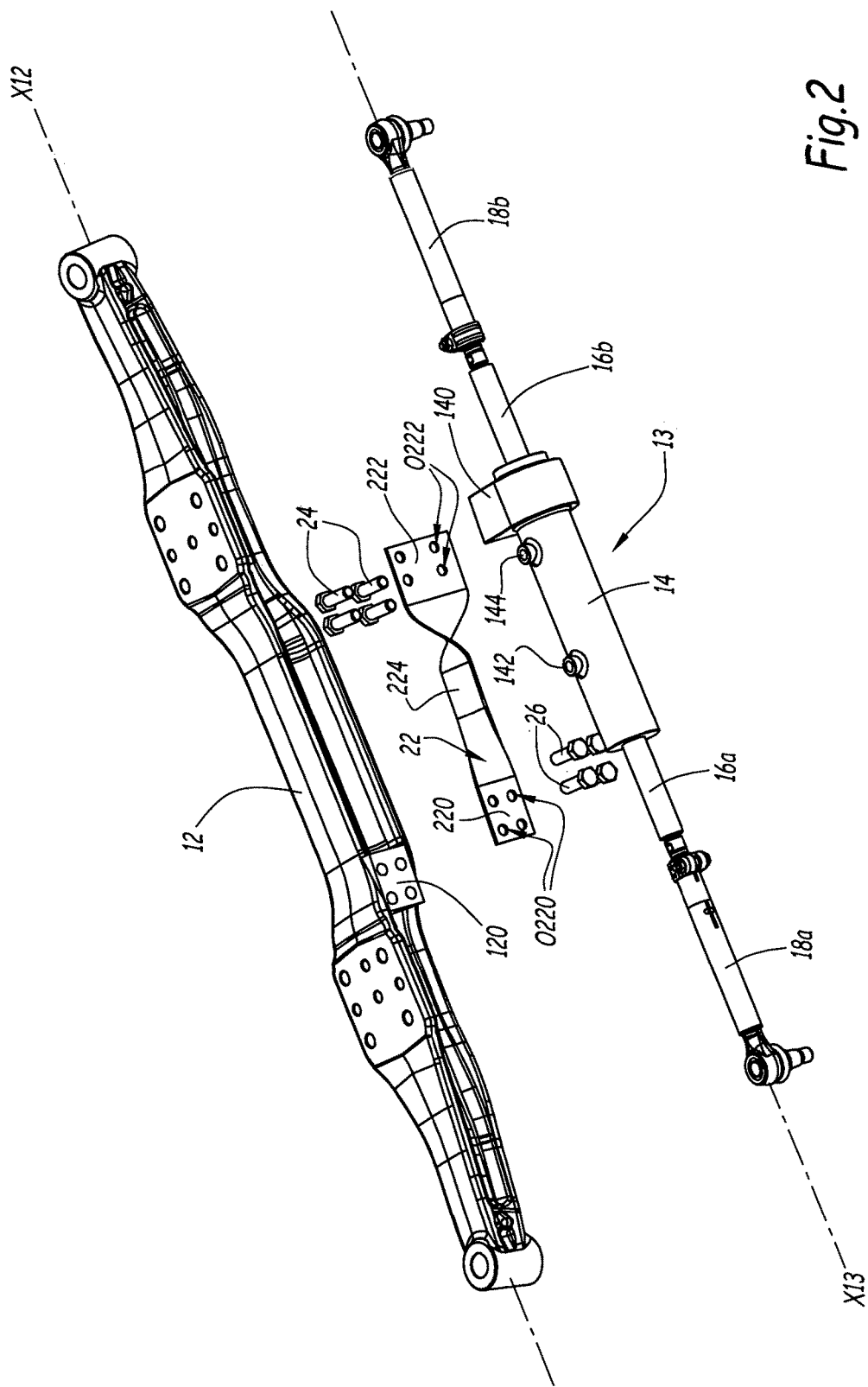
FIG. 2 is an exploded view of a steering arrangement and of a wheel axle belonging to the vehicle of FIG. 1.

Steering arrangement 13 is better visible on FIG. 2. It extends along a horizontal axis X13 that is perpendicular to longitudinal axis X2 of the vehicle 2. It is secured to a wheel axle 12 extending along a horizontal axis X12 parallel to axis X13. Steering arrangement 13 includes a hydraulic steering cylinder 14 having an inlet 142 for receiving a high pressure fluid, such as oil, and an outlet 144 for evacuating low pressure fluid. The kinematics of the steering arrangement 13 is such that the steering cylinder 14 may rotate in a horizontal and in a vertical plane relative to the wheel axle 12. Therefore, axis X13 is not always parallel to axis X12.

Inlet 142 and outlet 144 are configured to be connected to a non-represented power steering equipment. Power steering equipment includes a fluid reservoir, a pump and a control valve for providing the steering cylinder 14 with fluid at a predetermined pressure that depends on signals received from a sensor measuring the degree of rotation of the hand-operated steering wheel. This allows then adapting the steering force and changing the vehicle direction.

Two piston rods 16a and 16b are provided to be extended from and retracted into the cylinder 14 depending on the fluid pressure in the steering cylinder chamber. Left and right piston rods 16a and 16b are respectively extended by extension tubes 18a and 18b so as to adjust the length of the steering system.

Figure 3:
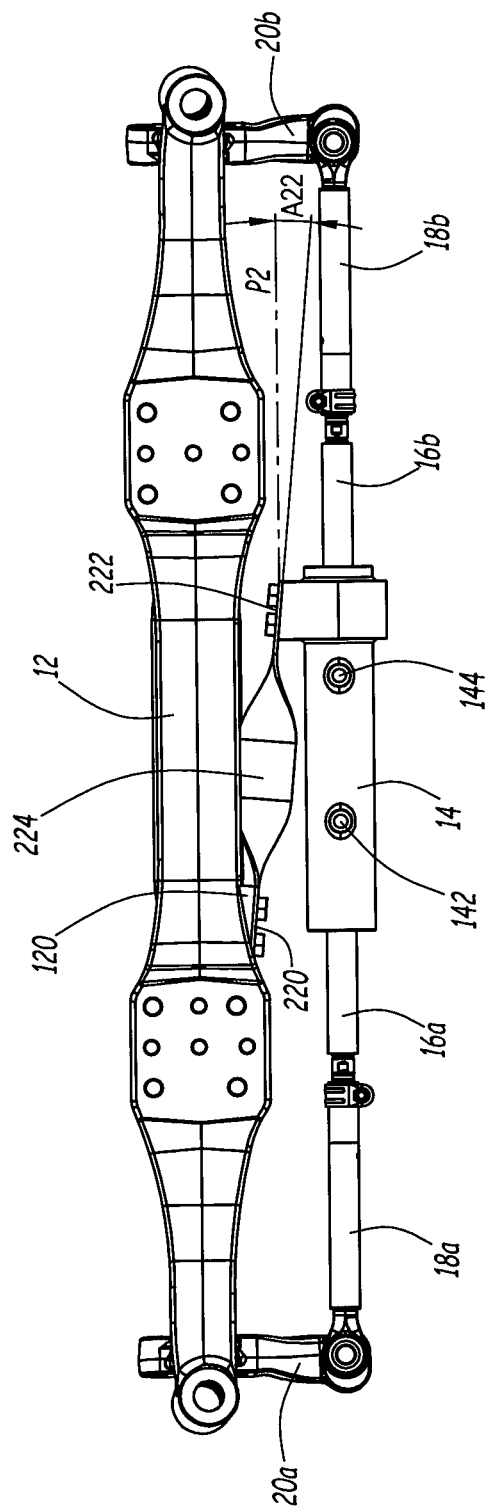
FIG. 3 is a top view of the steering cylinder of FIG. 2, once assembled on the wheel axle.
Figure 4:
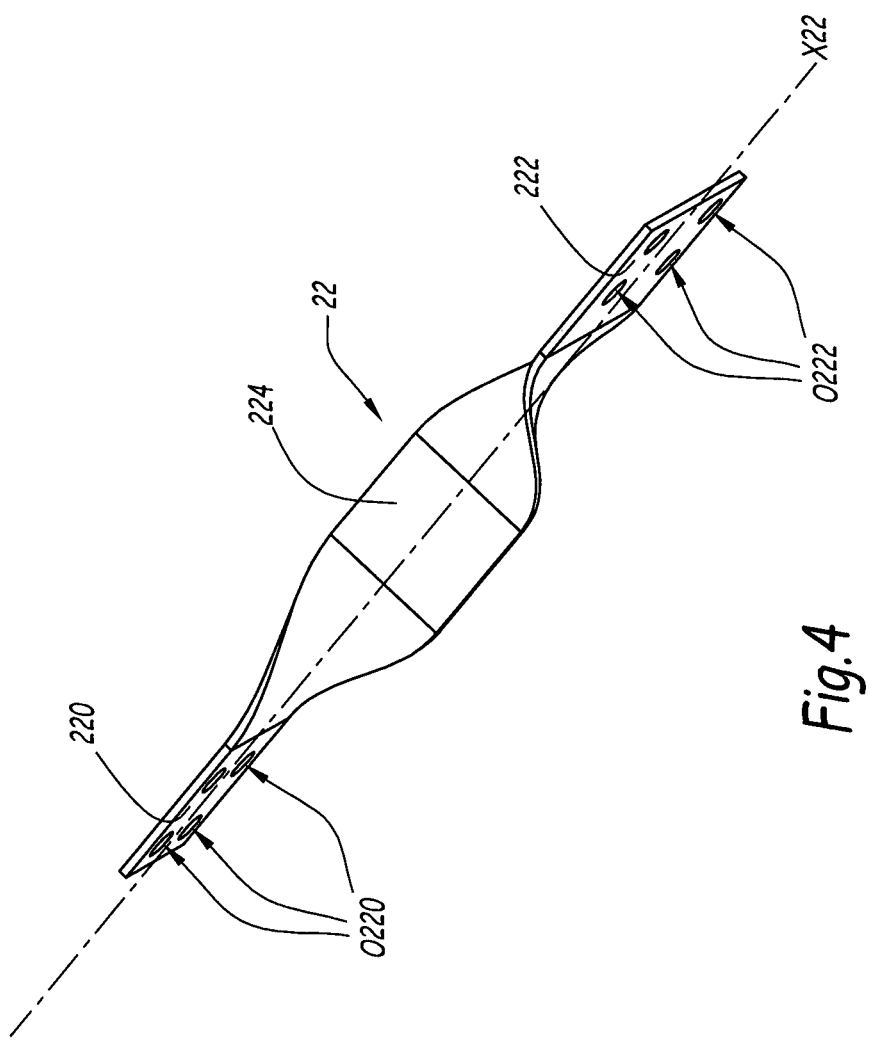
FIG. 4 is a perspective view of the bar for attaching the steering cylinder of FIGS. 2 and 3 to the wheel axle.

As shown on FIG. 3, the steering arrangement 13 is disposed behind the wheel axle 12 in assembled state within the vehicle 2, extension tubes 18a and 18b are respectively articulated with levers 20a and 20b that are further connected with nonrepresented wheel rims. More precisely, ball joints link the extension tubes 18a and 18b to the levers 20a and 20b. Steering cylinder 14 is attached to wheel axle 12 by means of a bar 22 that is better visible on FIG. 4. Bar 22 is manufactured on the basis of a non-represented rectangular plate having a length comprised between 20% and 70% of the wheel axle length, preferably between 30% and 50% of the wheel axle length. Bar 22 extends along a longitudinal axis X22, that is parallel to the greatest dimension of the bar, which is the length in the example. The rectangular plate is cut out from a large panel that may be a metallic or a composite panel. In the present description, a composite material shall be interpreted as a fiber reinforced matrix, such as plastic reinforced with glass or carbon fibers or as a multilayer material. The rectangular plate is then twisted around its longitudinal axis X22. To that purpose, a middle plate 224 of bar 22 may be clamped and the longitudinal ends 220 and 222 of the plate may be each pivoted, in opposite directions, by a twisting angle, that may be different for the two ends 220 and 222. This results in a bar that is twisted around its longitudinal direction. In this example, the twisting angle is 90° for both ends 220 and 222. The bar thickness being negligible compared to the bar length and to the bar width, bar 22 is flexible.

First end plate 220 is intended for attaching to bar 22 to wheel axle 12 and second end plate 222 is intended for attaching bar 22 to steering cylinder 14. End plates 220 and 222 are arranged parallel to one another and delimit each four through holes O220 and 0222 for fixing screws 26 and 24. As a result, bar 22 is bolted at each extremity, respectively to steering cylinder 14 and to wheel axle 12. To that end, wheel axle 12 and steering cylinder 14 have each a fixing portion, respectively 120 and 140, provided with four threaded holes complementary to fixing screws 26 and 24. Middle plate 224 is perpendicular to the end plates 220 and 222.

As shown in FIG. 3, bar 22 is arranged globally parallel to the axle axis X12. More precisely, at assembled state of bar 22 in truck 2, longitudinal axis X22 of bar 22 is inclined relative to axis X12 with an angle A22 with an angle A22 that is inferior to 20° and preferably inferior to 10°. This allows preventing bar 22 from buckling under operating conditions.

Since bar 22 being twisted, it can be easily compressed or extended along longitudinal direction X22. It can then absorb wheel axle deformation so as to avoid transmitting axle load to steering cylinder and the steering cylinder motion with respect to the wheel axle 12. Further, bar 22 being fixed at both extremities, it does not move under driving conditions so that steering arrangement 13 is stable.

In a non-represented alternative embodiment, steering arrangement 13 may be disposed in front of the axle 12.

In another non-represented alternative embodiment, bar 22 is twisted with an angle that is more or less than 90°. In particular, bar 22 can be twisted twice or more.

In another non-represented alternative embodiment, only one longitudinal end 220 or 222 of the cut-out plate is pivoted, the other end being fixed.

In another non-represented alternative embodiment, bar 22 may be attached to both the steering cylinder and the axle otherwise than with fixing screws. For instance, bar 22 may be welded, glued or riveted. Further, a flange may be used to clamp bar 22 to the steering cylinder and/or to the wheel axle 12. This flange would be fastened around the bar ends.

It is to be understood that the present invention is not limited to the embodiments described above and illustrated in the drawings. Rather, the skilled person will recognize that many changes and modifications may be made within the scope of the appended claims.

Besides, the technical features of the different embodiments and alternative embodiments of the invention described here-above can be combined together to generate new embodiments of the invention.

The invention claimed is:

1. A bar configured for attaching a steering cylinder of a vehicle to a wheel axle, wherein the bar is twisted around its longitudinal axis and includes two end plates at opposite ends of the bar for securing the bar to the steering cylinder and to the wheel axle, the two end plates being parallel.

2. The bar according to claim 1, wherein each end plate delimits at least one hole for a fixing screw or a rivet.

3. The bar according to claim 1, comprising a middle plate that is perpendicular to the two end plates.

4. The bar according to claim 1, wherein the bar is in metal or in composite material.

5. A vehicle, comprising a wheel axle, a steering cylinder and a bar for attaching the steering cylinder to the wheel axle, wherein the bar is according to claim 1.

6. A vehicle, comprising a wheel axle, a steering cylinder and a bar for attaching the steering cylinder to the wheel axle, the bar being twisted around a longitudinal axis thereof, wherein, in an assembled state of the bar in the vehicle, the bar is inclined with an angle inferior to 20° relative to a longitudinal axis of the wheel axle.

7. The vehicle according to claim 5, wherein the steering cylinder is arranged in front of or behind the wheel axle.

8. The vehicle according to claim 5, wherein the bar is bolted or riveted to the steering cylinder and/or to the wheel axle.

9. The vehicle according to claim 5, wherein the bar is clamped to the steering cylinder and/or to the wheel axle by means of a flange.

10. A process for manufacturing a bar configured for attaching a steering cylinder of a vehicle to a wheel axle, comprising:
 a) cutting out a rectangular plate of metallic material or of composite material, and
 b) pivoting one end or pivoting both ends in opposite directions, around a longitudinal axis of the rectangular plate so that opposite ends of the bar for securing the bar to the steering cylinder are parallel.

11. The process according to claim 10, wherein, at step b), both ends are pivoted by the same twisting angle.

12. The process according to claim 11, wherein, at step b), both ends are pivoted by a twisting angle of 90° around the longitudinal axis.

13. The process according to claim 10, wherein the process includes a step posterior to step a) and anterior to step b) of clamping a middle portion of the bar.

* * * * *